F. SIEMEN.
SILAGE MACHINE.
APPLICATION FILED AUG. 3, 1914.

1,202,597.

Patented Oct. 24, 1916.
3 SHEETS—SHEET 1.

Witnesses

Inventor
F. Siemen,
By Chandler & Chandler

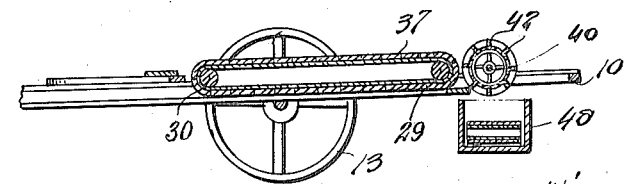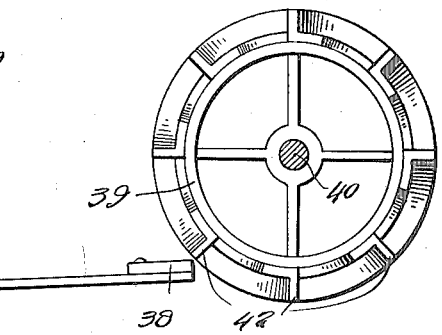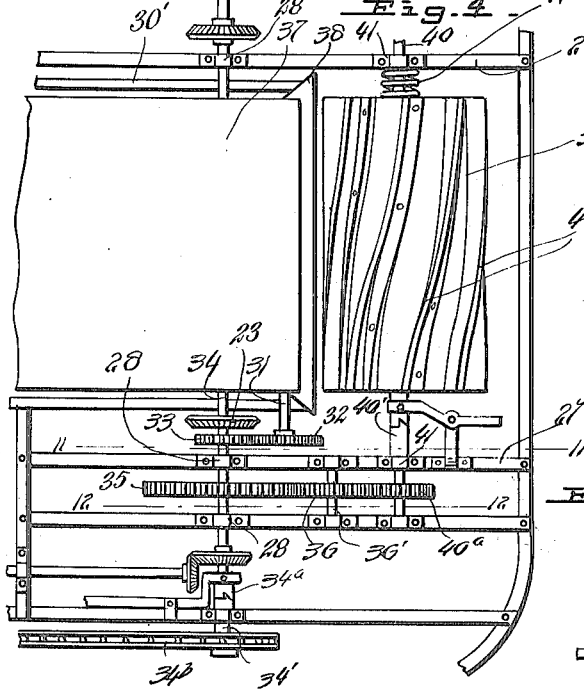

F. SIEMEN.
SILAGE MACHINE.
APPLICATION FILED AUG. 3, 1914.
1,202,597.
Patented Oct. 24, 1916.
3 SHEETS—SHEET 3.
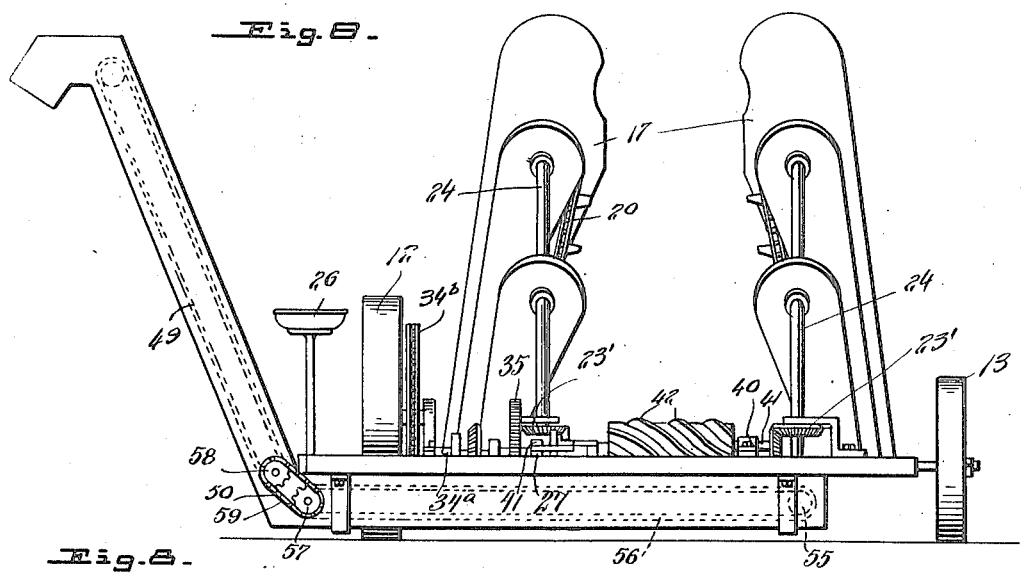
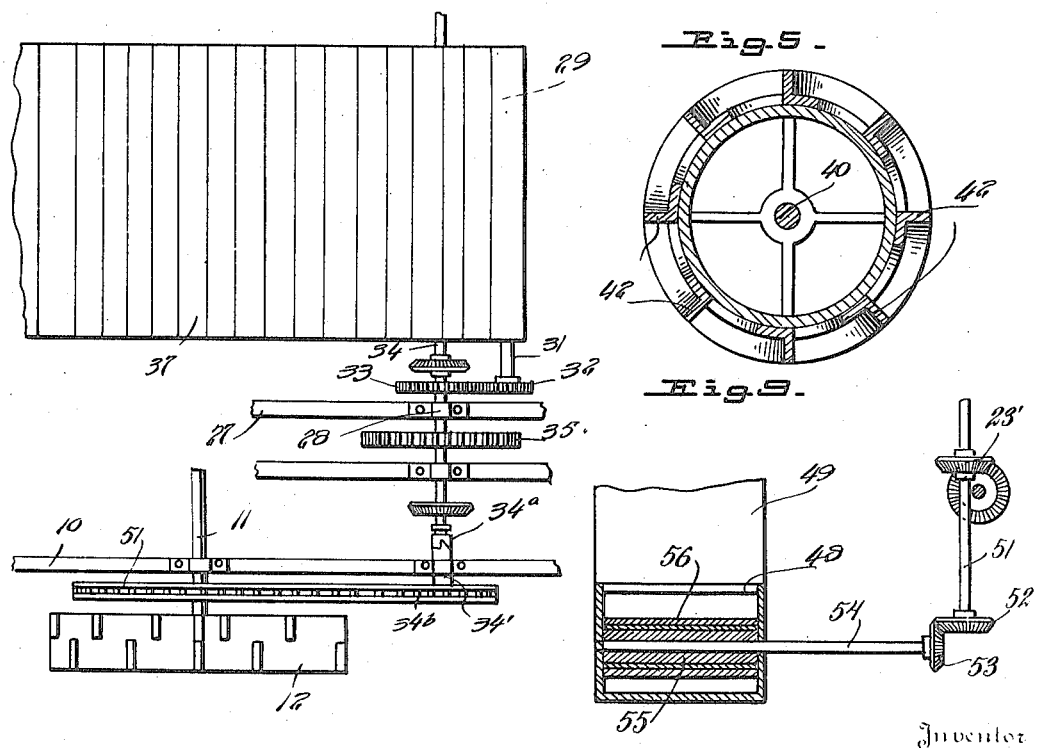
Witnesses
Inventor
F. Siemen
By Charles Chandler
Attorney

UNITED STATES PATENT OFFICE.

FRED SIEMEN, OF MILLER, SOUTH DAKOTA.

SILAGE-MACHINE.

1,202,597.  Specification of Letters Patent.  Patented Oct. 24, 1916.

Application filed August 3, 1914. Serial No. 854,804.

*To all whom it may concern:*

Be it known that I, FRED SIEMEN, a citizen of the United States, residing at Miller, in the county of Hand, State of South Dakota, have invented certain new and useful Improvements in Silage-Machines; and I do hereby declare the following to be a full, clear, and exact description of the invention, such as will enable others skilled in the art to which it appertains to make and use the same.

This invention relates to agricultural machinery and has special reference to an improved corn harvesting machine so arranged as to not only harvest the corn but also to cut the stalks up for use as ensilage.

The principal object of the invention is to provide an improved combination of fodder corn harvester and ensilage cutter so that the machine, being driven through the field, will supply from its delivery elevator ensilage already cut for storage.

Heretofore it has been customary to first harvest the corn and then cart the same to a machine for cutting up into suitable pieces for storage in the silo. This operation not only required a large number of laborers but also, on account of the corn being fed in bundles, required a high degree of motive power to operate a silage cutter of this capacity.

A second object of the present invention is to enable the stalks to be fed in a few at a time to the cutter knives, without bundling, while the machine is being moved along taking up a row of stalks so that while in their green, freshly cut condition they can be cut up into suitable sizes for storing in a silo.

With the above and other objects in view, the invention consists in general of certain novel details of construction and combination of parts hereinafter fully described, illustrated in the accompanying drawings, and specifically claimed.

Figure 1:
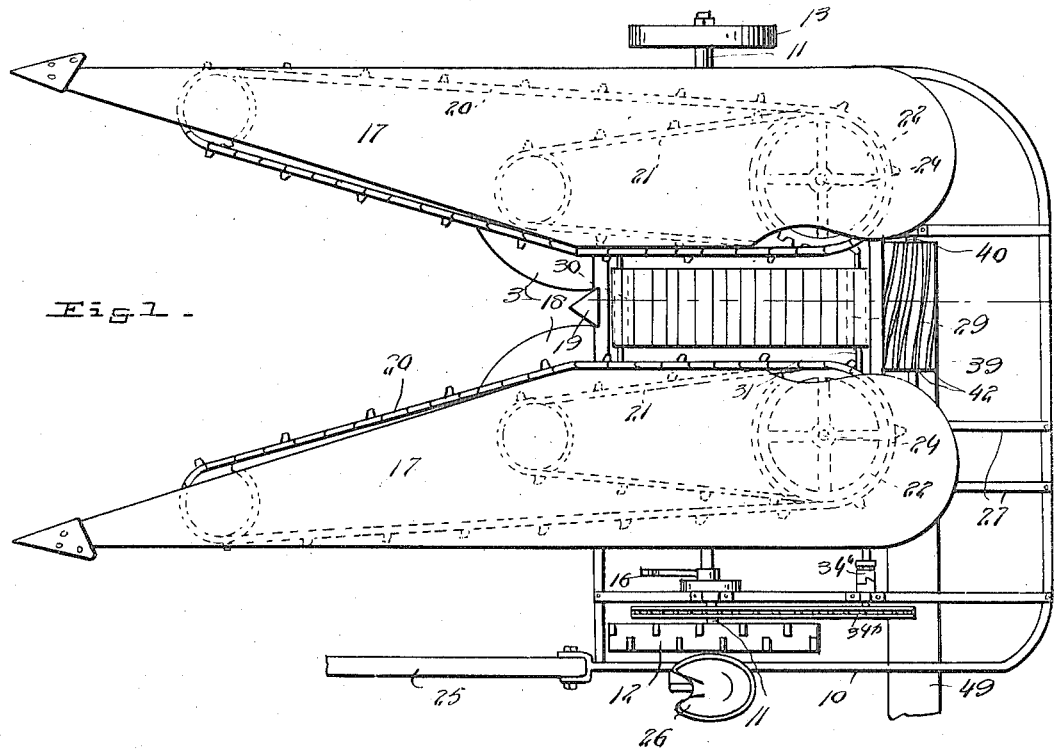
Figure 2:
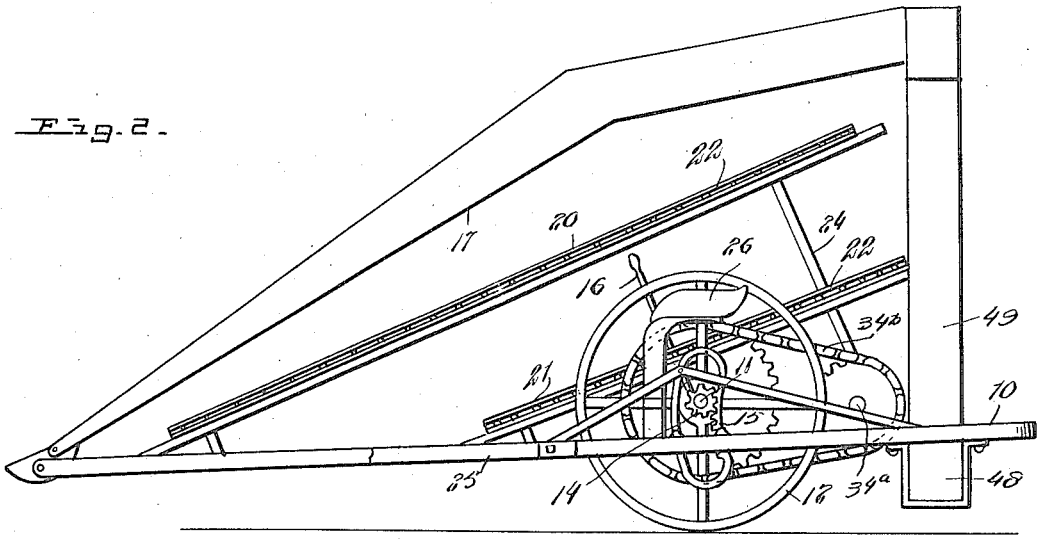

In the drawings, like characters of reference indicate like parts in the several views, and Figure 1 is a plan view of a machine constructed in accordance with this invention, Fig. 2 is a side elevation thereof, Fig. 3 is a section on the line 3—3 of Fig. 1, Fig. 4 is a detail view of the driving mechanism for the revolving cutter knife. Fig. 5 is a detail view of the knife removed from the rest of the machinery, Fig. 6 is a rear elevation of the machine showing the elevator, Fig. 7 is an enlarged detail view showing the relation of the revolving cutter and the stationary cutter knife. Fig. 8 is a detail view showing the driving mechanism for the conveyer. Fig. 9 is a detail view showing the driving mechanism for the elevator. Fig. 10 is a detail cross section through the elevator. Fig. 11 is a section on the line 11—11 of Fig. 4, Fig. 12 is a section on the line 12—12 of Fig. 4.

While the machine shown in the drawings is arranged to cut a single row of stalks it will be obvious that various widths may be used.

Referring to the drawings numeral 10 indicates the main frame of the machine.

At 11 is the axle whereon are mounted the ground wheels 12 and 13 the former being integral with the sprocket wheel 51. Freely revoluble on the axle is an elevating gear 14 which meshes with the segmental rack 15 fixed on the frame so that the latter may be raised and lowered, the elevating gear being controlled by the usual mechanism indicated in general at 16.

Mounted on the frame are the divider boards 17 of the ordinary construction and below these boards are the stationary knives 18 and a reciprocating knife 19 the latter being actuated by the ordinary mechanism which is not deemed necessary to be shown and which forms no part of the present invention.

At 20 are indicated the upper conveyer chains while the lower chains are shown at 21. These chains run from the usual sprockets 22 and are driven from the shaft 34 by means of the gears 23 and 23', the latter being fixed to the lower ends of the shafts 24, the rear sprockets 22 being mounted on said shafts.

All of the above construction is that common to corn harvesters and this harvester is provided with the usual draft rigging 25 and seat 26 as any ordinary harvester.

Turning now to the improvements in the present invention there is provided on the main frame three frame members 27 whereon are mounted boxes 28. Journaled in the lower boxes is a roller 30 while in the boxes 28' on the side bars of the frame 30' is journaled a similar roller 29 one of the journals projecting to form a shaft 31 whereon is mounted a gear 32 which meshes with a gear 33 mounted on a shaft 34 on which is also mounted a gear 35 which meshes with a gear 36 on the shaft 36'. By this means as the machine moves onward the roller rotates in a direction opposite that of the wheel. Around the rollers 29 and 30 extends a conveyer belt 37. Fixed on the frame at the upper end of the conveyer belt is a stationary knife or cutter 38.

At 39 is a cylinder which is provided with journals 40 resting in boxes 41 fixed to the frame in such position that the cylinder may revolve close to the cutter 38. On this cylinder is secured a series of spirally arranged blades 42 which, when the cylinder revolves, coact with the cutter 38 in a manner similar to the blades and knife bar of an ordinary hand operated lawn mower. The cylinder 39 revolves freely on the journal shaft 40 being arranged for clutching thereto by a clutch 40' normally having its members held in engagement by a spring 41'. Further the shaft 40 carries a gear 40$^a$ which meshes with the gear 36.

On the shaft 34 is mounted a sprocket having a sleeve hub 34' forming one member of a clutch, the other member 34$^a$ being splined to the shaft so that the two may coöperate to cause rotation when the sprocket rotates. This sprocket is connected by a chain 34$^b$ with a suitable sprocket 51 fixed upon the axle 11.

At 48 is a hopper to receive the cut fodder and leading from this hopper is a conveyer 49 of the usual type which is upwardly and laterally inclined and is driven by means of suitable gearing indicated in general at 50.

In the operation of the device, as the same is driven along the rows of corn the knives 18 and 19 sever the stalks which are carried up toward the cylinder 39 by means of the belt 37 and chains 20 and 21. When they reach the upper end of the belt 37 they are fed over the end of this belt and are cut in small pieces by the action of the cutter 38 and blades 42, dropping into the hopper 48 whence they are taken up by the conveyer 49 and delivered into a wagon at the side of the machine so that they will be taken direct to the silo and there stored.

While the drawings and specifications are based on a single row machine for removing corn from a field and cutting the same into ensilage, I, of course, do not wish to be limited to corn alone but take in all materials that are cut up into ensilage or might be, such as Kafir corn, the different kinds of canes, grasses, alfalfa and clovers, etc., that are and might be stored in a silo.

It is to be understood that I am not claiming a machine that gathers and cuts off the different materials but a machine that will cut any material into lengths suitable for storing in a silo and a machine that can be taken into a field and do this work as it is moving along and confining the work of gathering and cutting up into ensilage to one operation. The devices for the removal of any such crop from the field, that is cutting it off from the stalk, are well known and any suitable way could be followed.

One of the shafts 24 has an extension 51 to the lower end of which is fixed a beveled gear 52 which meshes with a similar gear 53 fixed to the outer end of the shaft 54. The shaft 54 is fixed to the outermost roller 55 in the hopper 48, whereby when said roller is rotated movement will be imparted to the conveyer belt 56 in said hopper. The belt will drive the sprocket 57, and since the same is connected to the sprocket 58 by a chain 59, the conveyer 49 will be driven.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

In combination, a corn harvester having a main frame, an axle journaled on the frame, a shaft, means connecting the shaft and axle to drive the shaft, upper and lower feed chains, vertical shafts common to both chains for driving the same, a gear on the lowermost end of one shaft, upper and lower gears on the outer shaft, a drum driven by a train of gearing from the first named shaft, said first named shaft having gears thereon, one of which is in mesh with the upper gear of one vertical shaft, while the other is in mesh with the gear of the other vertical shaft, blades on the drum, a knife on the frame to coact with the blades of the drum, a hopper disposed beneath the drum and knife, rollers at each end of the hopper, a conveyer belt engaged around the rollers, means for operatively connecting one of the rollers with the lower gear of one of the vertical shafts, and an elevator leading from one end of the hopper and laterally of the frame.

In testimony whereof, I affix my signature, in the presence of two witnesses.

FRED SIEMEN.

Witnesses:
  F. D. GREENE,
  J. L. GREENE.